Figure 1:
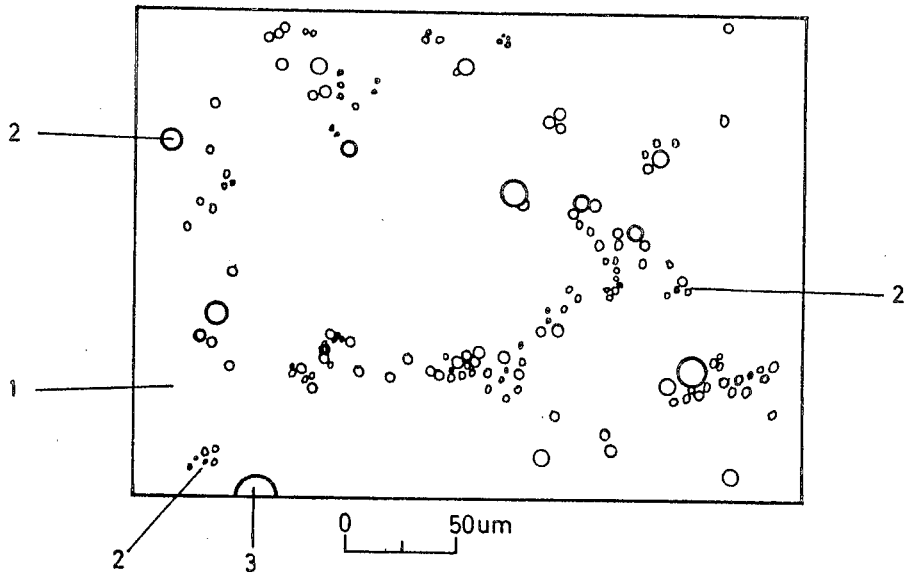
Figure 2:
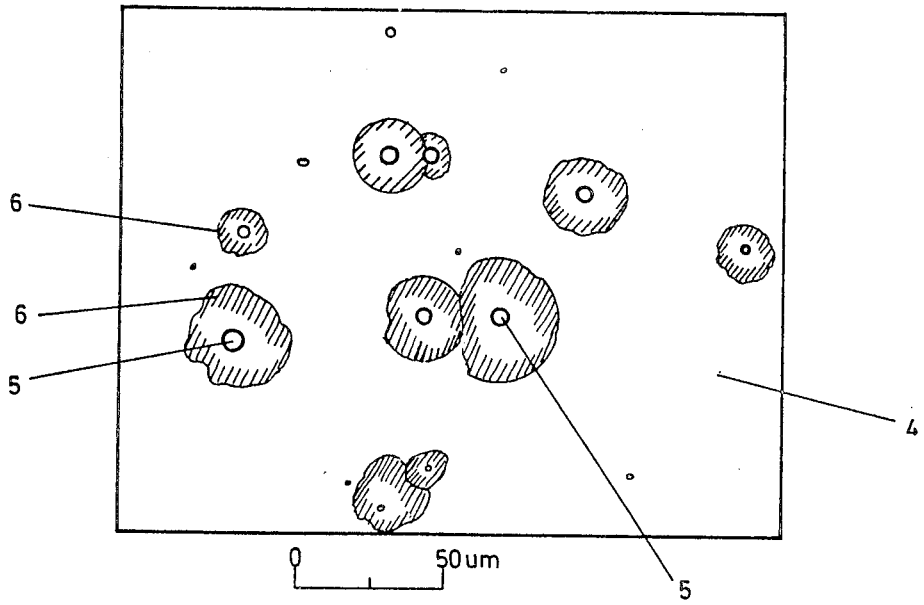
Figure 3:
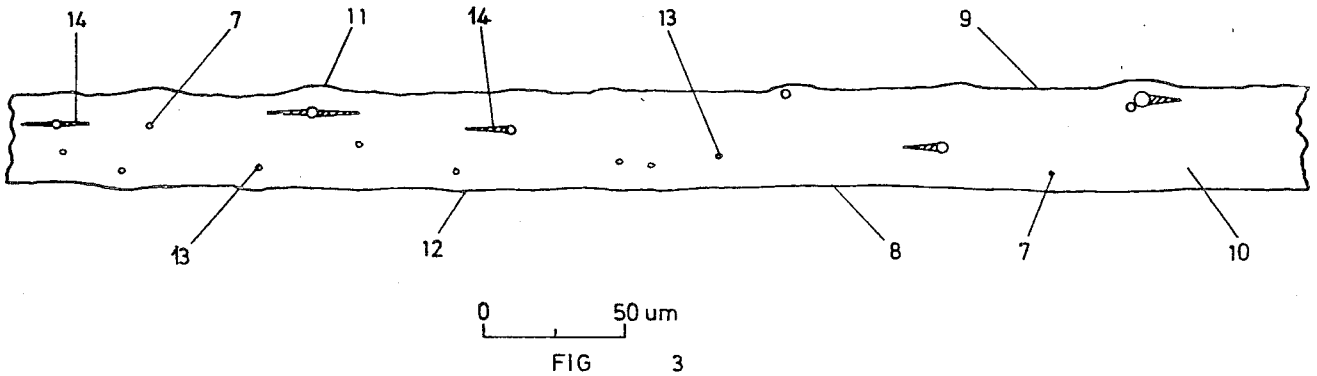

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 8

T952,010

POLYMERIC FILMS

Leslie Gregson, Welwyn Garden City, England, assignor to Imperial Chemical Industries Limited, London, England

Continuation of abandoned application Ser. No. 490,192, July 19, 1974. This application Nov. 18, 1975, Ser. No. 632,896

Claims priority, application United Kingdom, Aug. 7, 1973, 37,368/73

Int. Cl.[2] B29C *17/04;* D01F *1/10*

U.S. Cl. 260—37 R

2 Sheets Drawing. 19 Pages Specification

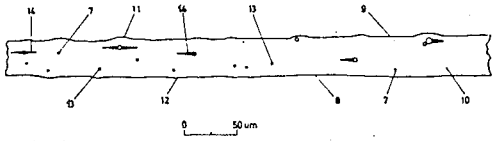

Synthetic polymeric films are disclosed having improved slip, and anti-blocking characteristics are disclosed which contain a minor amount of particulate glass beads therein. Blocking is the condition wherein successive layers of film wound onto a reel adhere to one another so as to exclude nearly all of the air from between the adjacent film layers. When unwound from the reel tearing of the film may occur.

I have discovered a polymeric film which is particularly adapted for use as a dielectric spacer in wound electrical capacitors so that rapid winding of the capacitor may be achieved. As the base film-forming material a number of polymers or copolymers may be used including polyolefins, polycarbonates, polysulphones, polyamides, polyesters and vinyl polymers. A preferred material is a crystalline polymer of propylene, either in the homopolymer form or copolymerized with up to 15% of other monomers such as ethylene.

Included in the film is from 0.01 to 5% of powdered glass or non-porous glass microspheres, and preferably the amount is from 0.1 to 1.0 or 0.2 to 0.8% of the glass additive, all calculated by weight based on the total weight of the polymer. The beads have a weight average particle diameter not exceeding 25 microns. The diameter of the glass beads depends, in part, on the thickness of the film into which they are incorporated as well as the ultimate end use of the film product. Accordingly, bead diameters are from 0.5 to 10 microns, and 2 to 8 microns.

The film-forming composition also preferably contains an oxyethylene antistatic agent, present in an amount of up to 5%, preferably from 0.1 to 1% by weight of the film-forming polymer, and represented by the formula:

$$R-N\begin{matrix}(CH_2CH_2O)_xH\\(CH_2CH_2O)_yH\end{matrix}$$

where R is a monovalent aliphatic radical containing from 12 to 22 carbon atoms and the sum of $x+y$ is from 2 to 5. The condensation product of tallow amine (1 mole) with ethylene oxide (2 moles) is a preferred compound. Other conventional additives such as dyes, pigments, lubricants, anti-oxidants, anti-blocking agents, surface-active agents, slip aids, gloss-improvers, prodegredants and ultra-violet light stabilizers may be included.

Using a combination of glass microbeads and an oxyethylene derivative, both as described above, I have observed a rapid development of the desired antistatic characteristics, as determined by measuring the surface resistivity of the film, which enables the film to be used promptly after the film production, particularly in packaging operations.

The resultant films are of excellent clarity and exhibit desirable surface resistivity (anti-static), blocking coefficient (anti-blocking) and coefficient of friction properties.